United States Patent [19]

Eimerl

[11] Patent Number: 4,697,100
[45] Date of Patent: Sep. 29, 1987

[54] DEUTERATED L-ARGININE PHOSPHATE MONOHYDRATE

[75] Inventor: David Eimerl, Pleasanton, Calif.

[73] Assignee: The United States of America as represented by the United States Department of Energy, Washington, D.C.

[21] Appl. No.: 819,654

[22] Filed: Jan. 17, 1986

[51] Int. Cl.$^4$ .......................... H03F 7/00; H01S 3/10; G03C 1/00
[52] U.S. Cl. ................................... 307/427; 252/600; 372/22
[58] Field of Search .................. 307/427, 425; 372/22; 252/600

[56] References Cited

PUBLICATIONS

Yariv, "Optical Second-Harmonic Generation", *Introduction to Optical Electronics*, (Holt, Reinehart and Winston, Inc., 1971) Sec. 8.3, pp. 189–194.

Hobden, "Phase-Matched Second Harmonic Generation in Biaxial Crystals", *Journal of Applied Physics*, vol. 38, No. 11, Oct. 1967, pp. 4365–4372.

Ito, "Generalized Study . . . Biaxial Crystals", *Journal of Applied Physics*, vol. 46, No. 9, Sep. 1975, pp. 3992–3998.

Laudise, "Growth From Liquid Solution", *The Growth of Sigle Crystals*, (Prentice-Hall, 1970) pp. 256–323.

Aoki et al, "The Crystal Structure of L-Arginine Phosphate Monohydrate", *Acta Cryst*, (1971) B27, pp. 11–23.

Dong et al, "A New Phase-Matchable Nonlinear Optic Crystal—L-Arginine Phosphate Monohydrate", *Acta Chimica Sinica*, vol. 41, No. 6, Jun. 1983, pp. 570–573.

Dong et al, "A New Phase-Matchable Nonlinear Optical Crystal—L-Arginine Phosphate Monohydrate (LAP)", *Acta Chimica Sinica*, Communication #2, 1983, pp. 230–233.

Eimerl, "Thin-Thick Quadrature Frequency Conversion", Proceedings of the International Conference on Lasers '84, Nov. 26–30, 1984, pp. 557–559.

Zernike et al, "Phase Matching", *Applied Nonlinear Optics*, (John Wiley and Sons, 1973) Chapters 3, 6 and 7, pp. 54–73 and 125–177.

Eimerl, "The Potential for Efficient Frequency Conversion at High Average Power Using Solid State Nonlinear Optical Materials", Lawrence Livermore National Laboratory Report UCID-20565, (1985) pp. 92–95.

*Primary Examiner*—James W. Davie
*Attorney, Agent, or Firm*—P. Martin Simpson, Jr.; Clifton E. Clouse, Jr.; Judson R. Hightower

[57] ABSTRACT

The new crystal deuterated l-arginine phosphate monohydrate provides an excellent frequency conversion crystal for laser applications, especially in the one micron wavelength region.

18 Claims, 2 Drawing Figures

DEUTERATED L-ARGININE PHOSPHATE MONOHYDRATE

The United States government has rights in this invention pursuant to Contract No. W-7405-ENG-48 between the United States Department of Energy and the University of California for the operation of Lawrence Livermore National Laboratory.

FIELD OF THE INVENTION

The present invention relates to a crystalline composition of matter for use as a harmonic conversion medium for laser light.

BACKGROUND OF THE INVENTION

The field of harmonic conversion of laser light contains many candidate materials for harmonic conversion. It is estimated that there may be in excess of 100,000 candidate crystalline materials to choose from in testing for suitability in laser harmonic conversion applications. However, as testing takes place deficiencies are usually detected in one property or another. A good material should efficiently convert the laser light, should be machinable, should be minimally hydroscopic if at all, and should be capable of relatively fast crystal growth.

Efficient frequency conversion can occur in several ways. These ways are referred to in the laser art as Type I and Type II harmonic conversion and as Type I, Type II and Type III sum frequency and difference frequency mixing. Each is well known in the laser art as shown by the references "Phase-Matched Second-Harmonic Generation in Biaxial Crystals", by M. V. Hobden, Journal of Applied Physics, Vol. 38, No. 11, October 1967; "Generalized Study on Angular Dependence of Induced Second-order Optical Polarizations and Phase Matching in Biaxial Crystals" by Hiromasa Ito, Journal of Applied Physics, Vol. 46, No. 9, September 1975; and *Introduction to Optical Electronics* by Amnon Yariv (Holt, Rinehart and Winston, Inc., 1971) at pages 189 to 198.

Crystal growth techniques suitable for making harmonic conversion crystals are well known in the art. The crystals can be grown in solution or by use of a seed crystal. Examples are contained in the book R. A. Landise "The Growth of Single Crystals" (Prentice Hall 1970), Chapter 7.

The current standard in the harmonic conversion crystal field for converting laser light in the one micron region is potassium dihydrogen phosphate (KDP). KDP is marginally hydroscopic, and it has a damage threshold of 7 Joules/cm$^2$. Thus KDP degrades due to exposure to the atmosphere and can be one of the first optical components to damage in a high power laser. For these reasons, a long-term, multi-year search was undertaken at Lawrence Livermore National Laboratory (LLNL) and by others in the art to find a substitute material for KDP. This effort revealed the literature reference "L-Arginine Phosphate Monohydrate" by Katsuyuki Aoki, et al., Acta Cryst. (1971) B27, 11. and "A New Phase Matchable Nonlinear Optic Crystal L-Abginne Phosphate Monohydrate", Acta Chimica Sinica, Vol. 41, No. 6 (June 1983) by Xu Dong, et al.

Aoki, et al. describe the crystalline structure of l-arginine phosphate monohydrate (LAP). Dong, et al. reports that their crystal was placed in a laser beam to confirm that LAP would frequency double and sum frequency match. However, this prior work did not involve testing of the damage threshold of the LAP crystal, and even more importantly the prior LAP studies missed the 1.05 micron absorption band. Also, no further work has been found on detailed analysis to confirm the properties of LAP as a frequency converter. As part of the LLNL program in the area, LAP has been grown and characterized. The results reveal that LAP has excellent characteristics as a replacement for KDP except in one crutial aspect. LAP has an absorption band at one micron. Such absorption makes LAP useless in most harmonic conversion applications, which occur at one micron wavelength.

SUMMARY OF THE INVENTION

It is an object of the present invention to provide a material for harmonic conversion of laser light in the one micron band.

It is a further object of the present invention to provide a material for sum frequency and difference frequency mixing of laser light.

It is an additional object of the present invention to provide a frequency conversion crystal of increased damage threshold over KDP.

It is a further object of the present invention to provide a frequency conversion crystal of increased efficiency over KDP for frequency conversion in the one micon wavelength region.

The present invention introduces the new frequency converion crystal deuterated 1-arginine phosphate monohydrate (DLAP). DLAP is more efficient a frequency converter in the one micron wavelength region than KDP, the standard crystal presently in the field. In addition, DLAP has double the damage threshold of KDP, and the crystals grow faster.

Additional objects, advantages and novel features of the present invention will be set forth in part in the following description, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Figure 1:
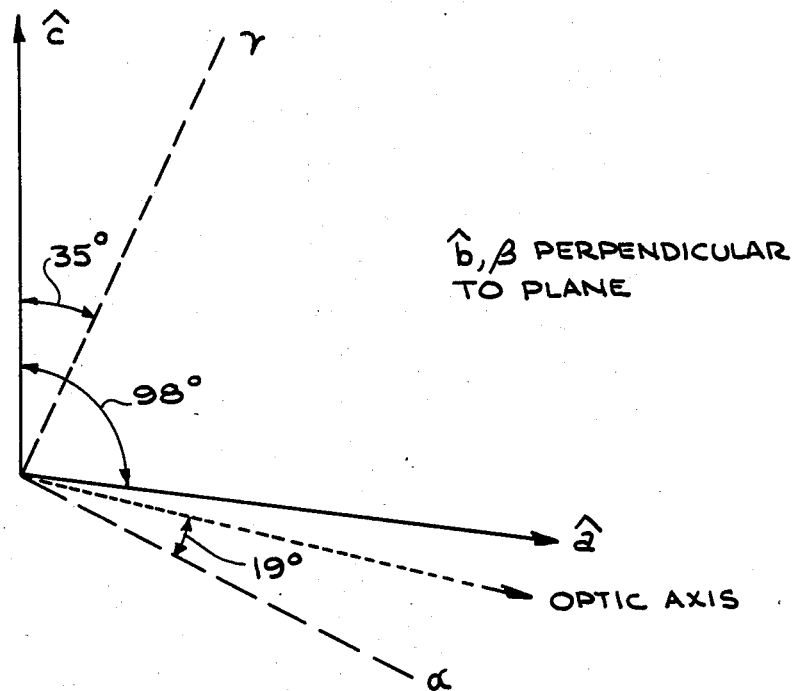
FIG. 1 shows the positions of LAP's principle dielectric axes with respect to the crystallographic directions.

The new frequency conversion crystal of the present invention is deuterated 1-arginine phosphate monohydrate (DLAP). The generalized formula of the crystal is as follows:

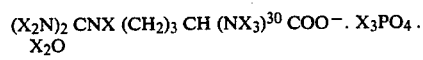

where at least one of the X's is a deuterium atom instead of a hydrogen atom. The perferred embodiment is according to the following formula:

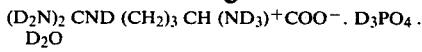

The original l-arginine phosphate monohydrate crystal (LAP) has the formula:

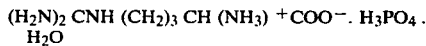

As can be seen, the deuterium substitutions of the preferred embodiment take place over all the hydrogen atoms except for the interior most in the carbon chain. The result of this substitution of deuterium for hydrogen is to shift an absorption band of LAP out of the one micron wavelength region. Measured LAP absorption was about 20 percent per centimeter range at 1.064 microns. This absorption is greatly reduced for DLAP. The degree of absorption reduction depends on how complete the substitution of deuterium atoms is for hydrogen atoms at the "X" locations in the above first formula. The more substitutions, the more the absorption reduction with the end application being the determining factor as to what is acceptable. Total replacement results in almost no absorption. Thus, DLAP is a useful crystal for frequency conversion in the one micron wavelength region whereas LAP was substantially not so, especially in higher power laser applications, where laser light absorption becomes a problem both from the standpoint of lost energy to the laser beam and of heating of the crystal. Heating of the crystal can cause laser beam propagation inhomogeneities as well as damage to the crystal. At high average power uses, this heating can be catastrophic.

The properties of LAP, which are substantially the same as DLAP, are as follows: the damage threshold is 14 to 15 Joules per square centimeter (KDP is 7 J/cm$^2$). LAP is not hydroscopic while KDP is slightly hydroscopic. The crystal can harmonically convert, sum frequency mix and difference frequency mix. The frequency doubling is Type I or Type II. In frequency tripling, DLAP sum frequency mixes the fundamental and its second harmonic by a particular Type II process, which is much more efficient than the usual mixing process in other nonlinear crystals. Fourth harmonics can be attained with Type I harmonic conversion. Crystals can be used in pairs in quadrature for efficient harmonic conversion. Quadrature and Types I and II harmonic conversion are described in David Eimerl "Thin Thick Quadrature Frequency Conversion" in Proceedings of the International Conference on Lasers '84, November 26–30, 1984 at page 557. Sum frequency and difference frequency mixing are well known in the art as shown by the reference Frits Zernicke, et al. *Applied Nonlinear Optics* (Wiley 1973) at Chapter 3 on Phase Matching, Chapter 6 on Parametric Up-Conversion and at Chapter 7 on Optical Parametric Amplification and Oscillation. One way to measure the efficiency of harmonic conversion is given in Lawrence Livermore National Laboratory Report UCID-20565, "The Potential for Efficient Frequency Conversion at High Average Power Using Solid State Nonlinear Optical Materials" by David Eimerl (1985) at pages 92 to 95. By this methodology, the crystal figure of merit can be six times greater than KDP for frequency doubling and three times greater than KDP for frequency tripling at 1.064 microns. In the 1.05 to 1.20 micron wavelength region, DLAP's tripling figure of merit can be as much as 100 times greater than KDP.

LAP is monoclinic, space group P2$_1$. FIG. 1 indicates the positions of its principle dielectric axes with respect to the crystallographic directions. In FIG. 1 the principle dielectric axis is parallel to crystallographic axis b and lies perpendicular to the plane of the drawing. Also, a and c are not perpendicular, while $\alpha$ and $\gamma$ are. The position of the optic axis is indicated by the dotted line. The optic angle, 2 V, is 38.1 degrees plus or minus 0.5 degrees. Table 1 lists the principal indices at 1.064 and 0.532 microns, deduced from a Sellmeier fit to indices measured in the visible. The Sellmeier fit is as follows:

$$n^2{}_\alpha = 1 + 1.236\, \lambda^2/(\lambda^2 - 0.0099)$$

$$n^2{}_\beta = 1 + 1.425\, \lambda^2/(\lambda^2 - 0.0131)$$

$$n^2{}_\gamma = 1 + 1.447\, \lambda^2/(\lambda^2 - 0.0135)$$

where $\lambda$ is the wavelength in microns and the accuracy of the fit is about plus or minus 0.002. Since the two larger indices are nearly equal, the phase matching properties approximate those of a negatively birefringent uniaxial crystal like KDP. In order to find the particular phase matching direction which optimizes $d_{eff}$, the elements of the d tensor must be determined. Since Kleinman symmetry has been experimentally determined to hold within plus or minus ten percent, the four unique d coefficients are $d_{\beta\alpha\alpha}$, $d_{\beta\beta\beta}$, $d_{\beta\gamma\gamma}$, and $d_{\beta\alpha\gamma}$. Experimentally determined values for these four nonlinear coefficients (to an accuracy of plus or minus 20%) along with relevant coherence lengths (to an accuracy of plus or minus 1%) are given in Table 2.

The method for making the DLAP was to start with a 25% solution of undeuterated LAP in deuterated water (greater than 99% D$_2$O) and at about 40 degrees centigrade allow the temperature to fall by natural cooling. Crystals of deuterated LAP precipitate out of solution. The precipitate crystal material is collected, and the procedure is repeated using the precipitate in place of undeuterated LAP. This second generation precipitate is then dissolved in D$_2$O at about 40 degrees centigrade, and the temperature is lowered by about 0.1 degrees centigrade per day over a period of several days. The number of days depends on how large crystals are desired, which can be determined by direct observation. The resulting crystal used in the above characterization experiments for DLAP was approximately 2 cm by 1 cm by 1 cm. This description refers only to the methods used to grow the actual crystals on which the optical characterization experiments were carried out. The degree of deuteration depends on the number of times that material is recrystallized from solution. The deuteration level also varies with the purity of the D$_2$O solvent and the temperature range over which precipitation occurs. The quality and size of the crystals depends on the rate of temperature lowering, the volume of solution, and the duration of crystal growth. The purest and optically cleanest crystals are obtained with the most recrystallizations and the most thermally stable crystal growth process. Crystals with incomplete deuteration or with reduced optical quality can be used (if deemed sufficient for the intended application). The essence of the invention is to use deuteration to reduce the optical absorption for improved performance in applications involving light of 1.064 micron wavelength.

The two most important embodiments of the invention are the doubling of the frequency of neodymium lasers operating at or near 1.064 microns in wavelength and the frequency mixing of the fundamental and second harmonic of such lasers to generate the third harmonic. The doubling is carried out by placing a crystal of DLAP in front of the laser beam and correctly orienting it according to the well-known art of phasematching such crystals so that it produces the most intense beams at the second harmonic. The phasematching scheme so employed may be Type I or Type II. The preferred doubling embodiment is to use two such crystals in sequence each using Type II phasematching, according to the quadrature arrangement.

The mixing scheme uses Type II phasematching in which the polarization (electric field direction) of the output wave at the third harmonic is parallel to the polarization of the input wave at the second harmonic and perpendicular to that of the input wave at the fundamental frequency. This arrangement is not possible in KDP. For this arrangement, the angular sensitivity of the crystal is particularly low, which is a very attractive situation for frequency mixing and leads to high conversion efficiency.

Figure 2:
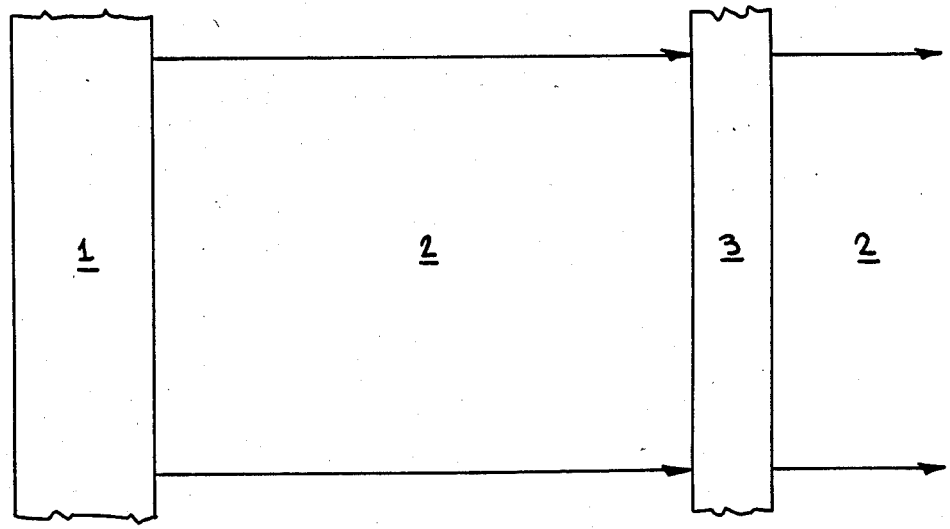
FIG. 2 schematically shows a laser generating a laser beam which then enters a frequency conversion crystal according to the present invention for frequency conversion of the laser beam.

Thus, the present invention provides a new frequency conversion crystal to efficiently frequency convert light. FIG. 2 schematically shows a laser 1 generating a laser beam 2 which then enters a frequency conversion crystal 3 according to the present invention for frequency conversion of the laser beam. Frequency doubling can occur over the wavelength range of 0.48 to 1.2 microns, and frequency tripling can be accomplished over the wavelength range of 0.67 to 1.2 microns. The specific interest in the art at substantially 1.06 microns is due to the prevalence of neodymium as a lasing medium for many applications.

The foregoing description of the preferred embodiments of the invention is provided for purposes of illustration and description. It is not intended to be exhaustive or to limit the invention to the precise forms disclosed and obviously many modifications and variations are possible in light of the above teachings. The embodiments were chosen and described in order to best explain the principles of the invention and their practical application to thereby enable others skilled in the art to best utilize the invention and the various embodiments and with various modifications as are suited to the particular use contemplated and it is intended that the scope of the invention is defined by the claims appended hereto.

TABLE 1

Refractive Indices of LAP

|  | 1.06μ | .532μ |
|---|---|---|
| $n_\alpha$ | 1.499 | 1.510 |
| $n_\beta$ | 1.563 | 1.579 |
| $n_\gamma$ | 1.570 | 1.587 |

TABLE 2

Nonlinear Coefficients and Coherence Lengths of LAP

| | |
|---|---|
| $d_{\beta\alpha\alpha} = .8$ pm/V | $l_{\beta\alpha} = 3.3\mu$ |
| $d_{\beta\beta\rho} = 1.5$ pm/V | $l_{\beta\beta} = 13.0\mu$ |
| $d_{\beta\gamma\gamma} = 1.35$ pm/V | $l_{\beta\gamma} = 21.7\mu$ |
| $d_{\beta\alpha\gamma} = .85$ pm/V | |

What is claimed is:

1. A crystalline composition of matter according to the formula:

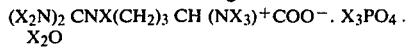
$(X_2N)_2 CNX(CH_2)_3 CH (NX_3)^+COO^- \cdot X_3PO_4 \cdot X_2O$ where one or more of the X's represent deuterium replacing hydrogen and with any remaining X locations still being hydrogen.

2. The crystalline composition of matter as in claim 1, wherein all the X locations are deuterium.

3. A method of harmonic conversion of light, the method comprising:
providing a laser beam and
placing at least one crystal according to the formula:

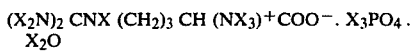
$(X_2N)_2 CNX (CH_2)_3 CH (NX_3)^+COO^- \cdot X_3PO_4 \cdot X_2O$ where one or more of the X's represent deuterium replacing hydrogen and with any remaining X locations still being hydrogen; and
orienting the at least one crystal to harmonically convert the laser beam.

4. The method of harmonic converion of light as in claim 3, wherein all the X locations are deuterium.

5. The method of harmonic converion of light as in claim 3, wherein the laser beam is in the wavelength range of 1.05 to 1.20 microns.

6. The method of harmonic converion of light as in claim 5, wherein the laser beam wavelength is substantially at 1.06 microns.

7. A method of sum frequency mixing of light, the method comprising:
providing a first laser beam;
providing at least one other laser beam of a frequency different from the first laser beam; and
placing at least one crystal according to the formula:

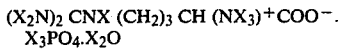
$(X_2N)_2 CNX (CH_2)_3 CH (NX_3)^+COO^- \cdot X_3PO_4 \cdot X_2O$ where one or more of the X's represent deuterium replacing hydrogen and with any remaining X locations still being hydrogen; and
orienting the at least one crystal to sum frequency mix the laser beam.

8. The method of sum frequency mixing of light as in claim 7, wherein all the X locations are deuterium.

9. The method of difference frequency mixing of light, the method comprising:
providing a first laser beam,
providing at least one other laser beam of a frequency different from the first laser beam, and
placing at least one crystal according to the formula:

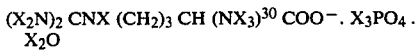
$(X_2N)_2 CNX (CH_2)_3 CH (NX_3)^{30} COO^- \cdot X_3PO_4 \cdot X_2O$ where one or more of the X's represent deuterium replacing hydrogen and with any remaining X locations still being hydrogen; and
orienting the at least one crystal to difference frequency mix the laser beam.

10. The method of difference frequency mixing of light as in claim 9, wherein all the X locations are deuterium.

11. The method of sum frequency mixing of light as in claim 7, wherein the first laser beam is in the wavelength range of 1.05 to 1.20 microns.

12. The method of sum frequency mixing of light as in claim 11, wherein the laser beam wavelength is substantially at 1.06 microns.

13. The method of difference frequency mixing of light as in claim 9, wherein the first laser beam is in the wavelength range of 1.05 to 1.20 microns.

14. The method of difference frequency mixing of light as in claim 13, wherein the laser beam wavelength is substantially at 1.06 microns.

15. The method as in claim 3, wherein the harmonic conversion is Type I.

16. The method as in claim 3, wherein the harmonic conversion is Type II.

17. An apparatus for frequency conversion of light, the apparatus comprising:
a laser for generating a laser beam; and
at least one crystal according to the formula:

$$(X_2N)_2CNX\ (CH_2)_3\ CH\ (NX_3)^+COO^-\cdot X_3PO_4\cdot X_2O$$

where one or more of the X's represent deuterium replacing hydrogen and with any remaining X locations still being hydrogen, the at least one crystal being placed in the laser beam in an orientation for frequency conversion of the laser beam.

18. The apparatus for frequency conversion of light as in claim 17, wherein all the X locations are deuterium.

* * * * *